US012718487B2

(12) United States Patent
Fan et al.

(10) Patent No.: US 12,718,487 B2
(45) Date of Patent: Aug. 25, 2026

(54) LABELING METHODS AND SYSTEMS FOR 3D POINT CLOUD SEGMENTATION

(71) Applicant: LiDARist Company Limited, Hong Kong (CN)

(72) Inventors: Wenzheng Fan, Hong Kong (CN); Chi San Lee, Hong Kong (CN); Man Ho Kwan, Hong Kong (CN); Wai Yeung Yan, Hong Kong (CN)

(73) Assignee: LiDARist Company Limited, Hong Kong (CN)

( * ) Notice: Subject to any disclaimer, the term of this patent is extended or adjusted under 35 U.S.C. 154(b) by 178 days.

(21) Appl. No.: 18/426,644

(22) Filed: Jan. 30, 2024

(65) Prior Publication Data

US 2025/0245931 A1 Jul. 31, 2025

(51) Int. Cl.
*G06T 19/00* (2011.01)
*G06T 7/10* (2017.01)

(52) U.S. Cl.
CPC ................ *G06T 19/00* (2013.01); *G06T 7/10* (2017.01); *G06T 2207/10028* (2013.01); *G06T 2207/20081* (2013.01); *G06T 2210/56* (2013.01); *G06T 2219/004* (2013.01)

(58) Field of Classification Search
None
See application file for complete search history.

(56) References Cited

U.S. PATENT DOCUMENTS 10,692,280 B2 * 6/2020 Shi .......................... G06T 7/521
2015/0022555 A1 * 1/2015 Chau ...................... G09G 5/377 345/635
2022/0262100 A1 * 8/2022 Chandler ................. G06T 5/70

* cited by examiner

*Primary Examiner* — Saptarshi Mazumder
(74) *Attorney, Agent, or Firm* — Rivka Friedman

(57) ABSTRACT

The present application relates to labeling methods and systems for 3D point cloud segmentation. The labeling method comprises steps of importing 3D point cloud data; determining a scenario of the 3D point cloud data; and if the scenario is that the 3D point cloud data includes no prior labeled data, adopting a 2D-image-based workflow to label the 3D point cloud data. In the 2D-image-based workflow, the 3D point cloud data is projected on 2D images to generate segmented masks under unsupervised image segmentation. The scenarios can comprise the 3D point cloud data includes sufficient labeled data and the 3D point cloud data includes insufficient labeled data. This present application also provides related processing steps. The labeling methods and systems can significantly reduce the time and manual effort for 3D point cloud semantic segmentation, allow an iterative process to conduct pre-labeling and re-labeling and increase accuracy at the same time.

9 Claims, 11 Drawing Sheets

LABELING METHODS AND SYSTEMS FOR 3D POINT CLOUD SEGMENTATION

TECHNICAL FIELD

The present disclosure relates to a field of artificial intelligence, and in particular to labeling methods and systems for 3D (three-dimensional) point cloud segmentation.

BACKGROUND

Deep learning-based 3D point cloud semantic segmentation requires intensive well-labeled training data, which are often unavailable or lacking. Experienced data annotators are required to conduct manual labeling on 3D point clouds prior to training any deep learning model. On the other hand, publicly-available point cloud databases may not provide an identical classification system as one desires. Also, the quality and integrity of publicly-available databases are often in doubt. Unlike image datasets, 3D point clouds usually come with geometric coordinates (i.e., x, y, and z), radiometry (i.e., backscattered intensity or RGB values if imagining system is embedded), and other information (e.g., return number, number of returns, etc.). Manual labeling and quality check on these spatially unstructured data are certainly expensive and time-consuming.

Traditional assistant software programs, such as CloudCompare and Amazon SageMaker, can offer visualization modules that allow users to conduct manual labeling. Users have to label each point individually, which is extremely inefficient. Some automatic labeling technologies under development may have adopted 3D unsupervised clustering on the point cloud, but there are issues with low accuracy. Therefore, what is needed are techniques that overcome the above-mentioned disadvantages.

SUMMARY

According to various embodiments of the present disclosure, labeling methods and systems for 3D point cloud semantic segmentation are provided.

A labeling method for 3D point cloud segmentation, the labeling method comprising steps of:

importing 3D point cloud data;

determining a scenario of the 3D point cloud data; and if the scenario is that the 3D point cloud data includes no prior labeled data, adopting a 2D-image-based workflow to label the 3D point cloud data; the 2D-image-based workflow comprising:

projecting the 3D point cloud data on 2D images;

generating segmented masks under unsupervised image segmentation;

obtaining a segmentation instruction;

editing the segmented masks according to the segmentation instruction;

re-projecting the segmented masks back to the 3D point cloud data; and labeling the 3D point cloud data.

A labeling system for 3D point cloud segmentation, comprising:

an importing module, a determining module, and a no prior labeled data processing module; wherein the importing module is configured to import 3D point cloud data;

the determining module is configured to determine a scenario of the 3D point cloud data;

the no prior labeled data processing module is configured to adopt a 2D-image-based workflow to label the 3D point cloud data, if the scenario is that the 3D point cloud data includes no prior labeled data; the 2D-image-based workflow comprising:

a projecting unit, a generating unit, an obtaining unit, an editing unit, a re-projecting unit, and a labeling unit; wherein the projecting unit is configured to project the 3D point cloud data on 2D images;

the generating unit is configured to generate segmented masks under unsupervised image segmentation;

the obtaining unit is configured to obtain a segmentation instruction;

the editing unit is configured to edit the segmented masks according to the segmentation instruction;

the re-projecting unit is configured to re-project the segmented masks back to the 3D point cloud data;

the labeling unit is configured to label the 3D point cloud data.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

In order to better describe and illustrate the embodiments and/or examples of the contents disclosed herein, reference may be made to one or more drawings. Additional details or examples used to describe the drawings should not be considered as limiting the scope of any of the disclosed contents, the currently described embodiments and/or examples, and the best mode of these contents currently understood.

DETAILED DESCRIPTION OF THE EMBODIMENTS

Figure 1:
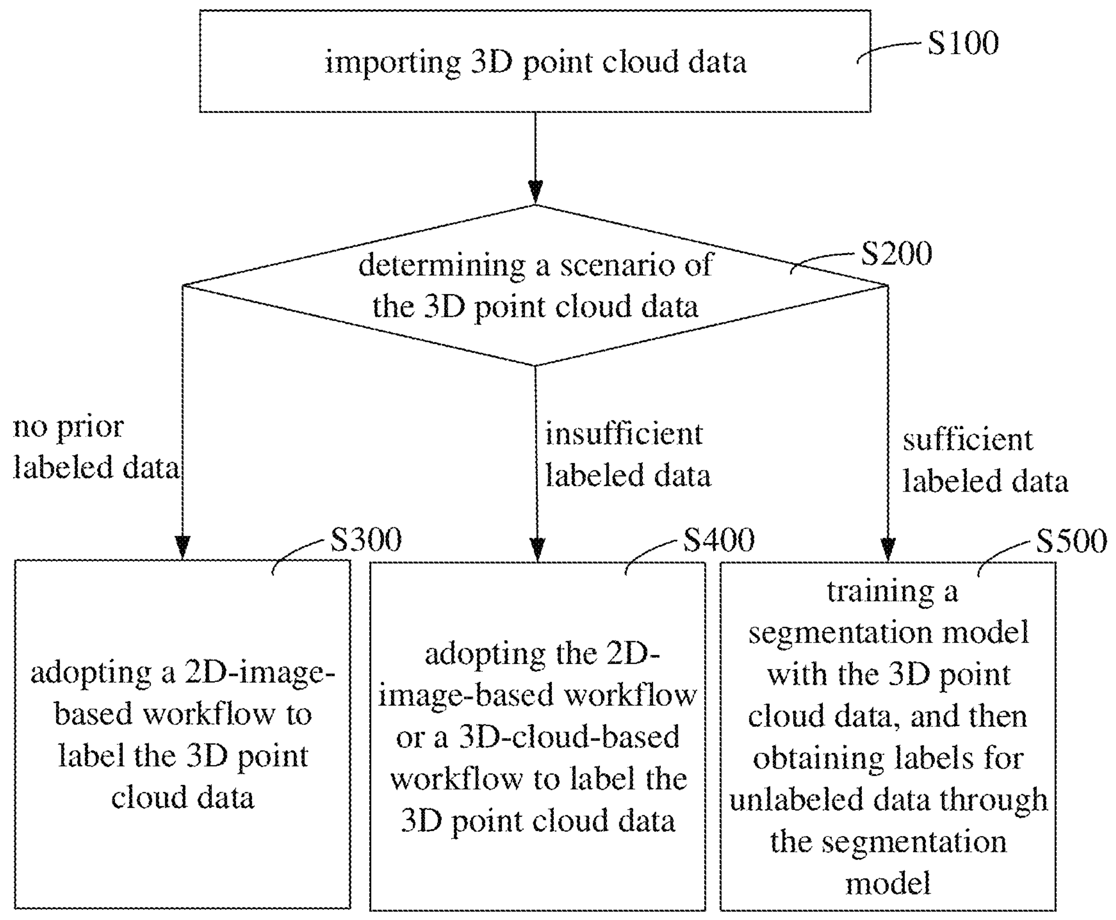
FIG. 1 illustrates a labeling method for 3D point cloud segmentation, according to an embodiment of the present disclosure.

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

Unless otherwise defined, all technical and scientific terms used herein have the same meaning as commonly understood by one of ordinary skill in the art to which this invention belongs. The definitions are provided to aid in describing particular embodiments, and are not intended to limit the claimed invention. The term "and/or" used herein includes any and all combinations of one or more related listed items.

In order to understand this application thoroughly, detailed steps and structures will be provided in the description below to explain the technical solution proposed by this application. Preferred embodiments of this application are described in detail below. However, in addition to these details, there may be other embodiments of this application.

An embodiment of the present disclosure provides a labeling method for 3D point cloud segmentation. The method aids in generating and refining training data for dense high-resolution 3D point clouds. The method can cooperate with a 3D visualization interface, which allows users to visualize and manipulate the 3D point clouds, perform pre-labeling and/or re-labeling, and conduct 3D point cloud segmentation. The method can also cooperate with an additional 2D visualization interface, which allows users to visualize and manipulate the 2D masks overlaid on the dedicated 2D images, alter the masks, and assign labeling and/or mask indexes.

The labeling method in some embodiments can be run in a standalone computing platform, such as Windows, an embedded virtual machine, such as Windows Subsystem for Linux (WSL), or in a cloud-based platform, such as Amazon Web Services (AWS). The storage here refers to hard drives (HDD) or solid-state drives (SSD) in a standalone platform or a cloud storage platform, such as Amazon Simple Storage Services (S3). The computing service refers to any standalone Windows-based, WSL or Linux-based platform or cloud computing platform such as Amazon SageMaker or Amazon Elastic Compute Cloud (EC2).

Referring to FIG. 1, in the embodiment of the present disclosure, a labeling method for 3D point cloud segmentation comprises the following steps:

S100, importing 3D point cloud data.

In some embodiments, the 3D point cloud data includes but is not limited to x, y, z, intensity (I), Red (R), Green (G), Blue (B), etc. in any point cloud format including but not limited to las, pts, or E57.

S200, determining a scenario of the 3D point cloud data.

The scenarios of the 3D point cloud data include no prior labeled data, which means that the 3D point cloud comprises no prior labeled data available. In some embodiments, the scenarios also include insufficient labeled data, which means that the 3D point cloud comprises prior labeled data but not sufficient, and sufficient labeled data, which means that sufficient labeled data exists.

Figure 2:
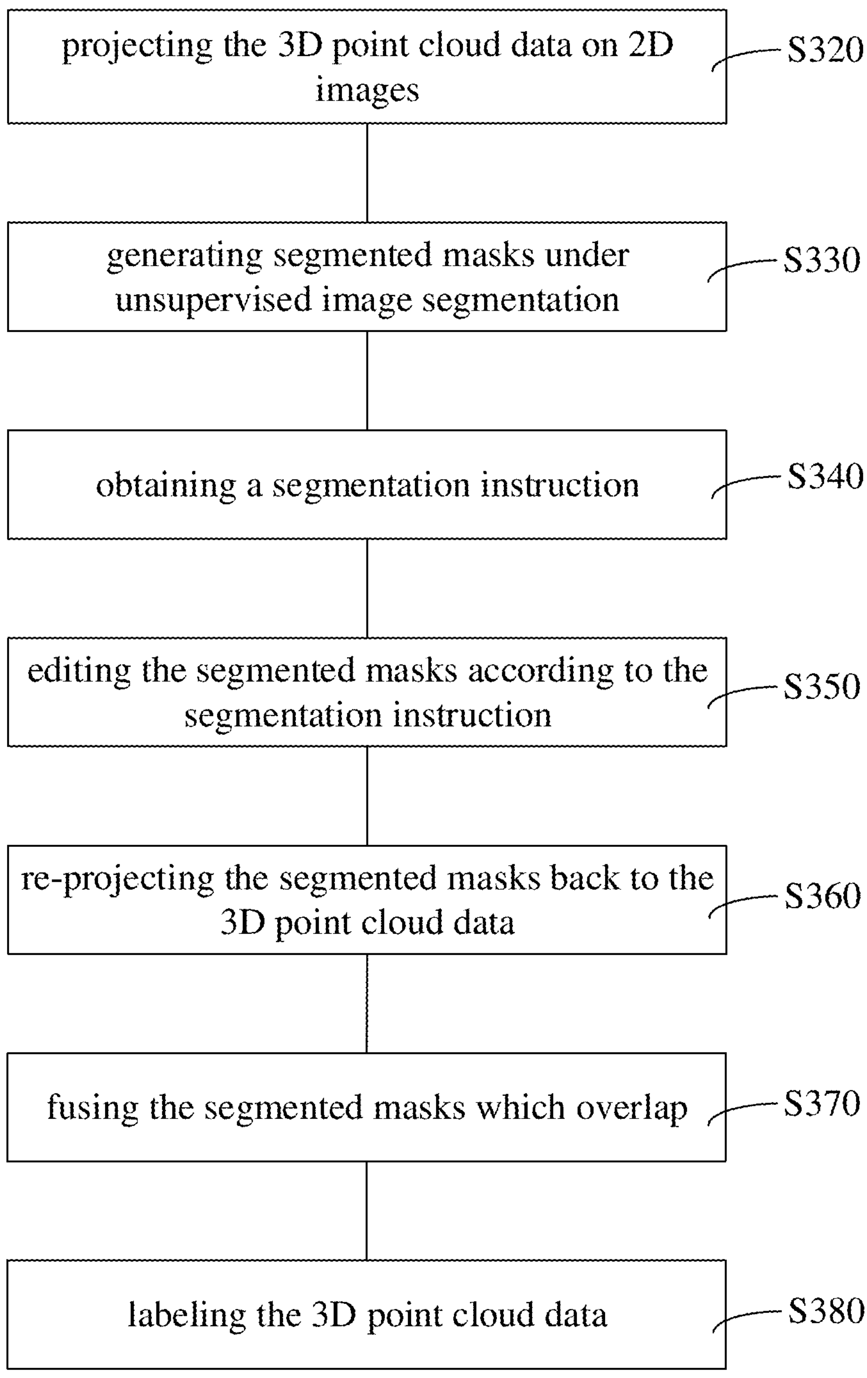
FIG. 2 illustrates a workflow of the step of S300 shown in FIG. 1.
Figure 2A:
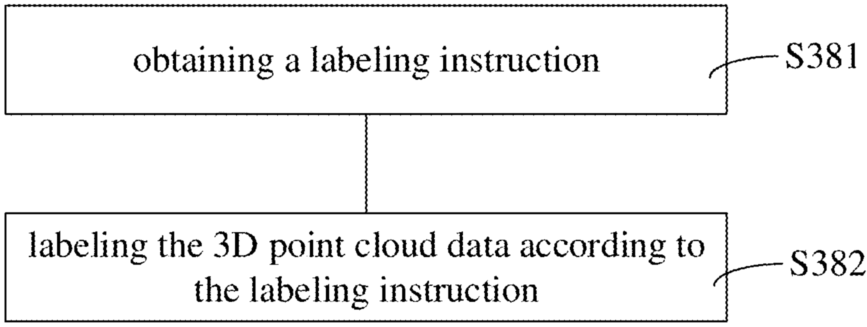
FIG. 2*a* illustrates a workflow of the step of S380 shown in FIG. 2.

S300, if the scenario is that the 3D point cloud data includes no prior labeled data, adopting a 2D-image-based workflow to label the 3D point cloud data. Referring to FIG. 2, the 2D-image-based workflow comprises:

S320, projecting the 3D point cloud data on 2D images. In an embodiment, the coloring of the projection could be based on (1) RGB, (2) intensity, including different coloring schemes of intensity values, or (3) depth values to the assumed projection plane.

S330, generating segmented masks under unsupervised image segmentation. In an embodiment, other segmentation methods, including semantic segmentation, instance segmentation, etc. can also be used here.

S340, obtaining a segmentation instruction.

S350, editing the segmented masks according to the segmentation instruction. For semantic segmentation labeling, masks/segments of different instances with the same label are not required to be combined. On the other hand, masks/segments of different instances are required to be separated, no matter if they are sharing the same label, in case of instance segmentation labeling.

S360, re-projecting the segmented masks back to the 3D point cloud data.

S370, fusing the segmented masks which overlap. In an ideal situation, if all points were visible on a single image, there would be no need for combining overlapping masks/segments. Of course, in some other scenarios, there is a need to combine overlapping masks/segments and fuse them together.

S380, labeling the 3D point cloud data.

In an embodiment, S380 comprises the following steps:

S381, obtaining a labeling instruction. In an embodiment, the labeling instruction can come from neural network inference results. In another embodiment, the labeling instruction also can come from manual inputs.

S382, labeling the 3D point cloud data according to the labeling instruction. The labeling is conducted based on the selection of the masks and the points it includes rather than a point-by-point selection.

In the step of S330, the segmented masks are generated under the image instance segmentation. In an embodiment, Meta Segment Anything Model (SAM) is an example that the training starts with human-labeled segmentation results while it ends with more training data that not all of the training data have human-labeled segmentation results included. Apart from Meta SAM, the unsupervised image segmentation model can be a density-based clustering non-parametric algorithm (DBSCAN) or normalized graph cuts.

Figure 3:
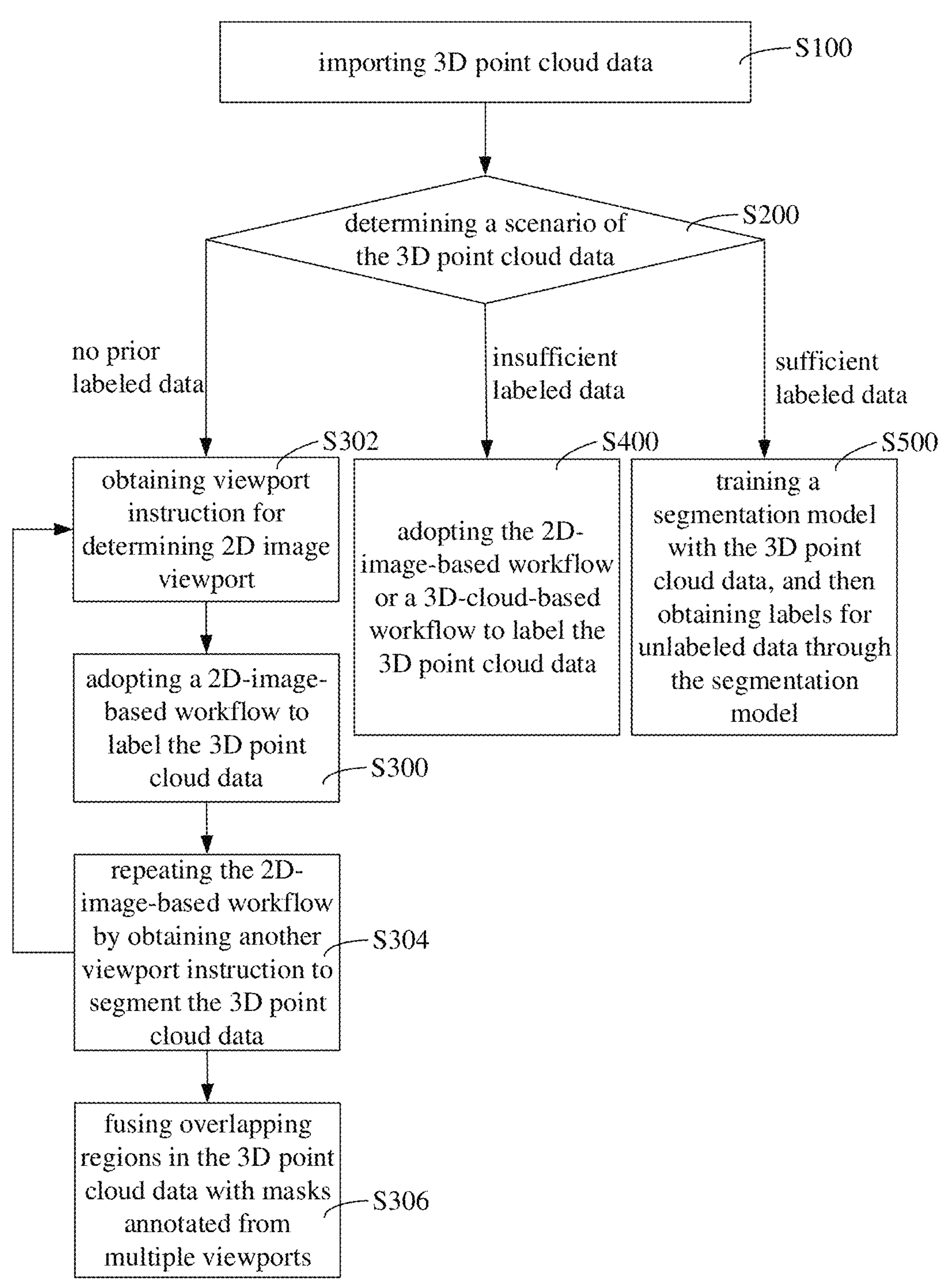
FIG. 3 illustrates a labeling method for 3D point cloud segmentation, according to another embodiment of the present disclosure.

Referring to FIG. 3, in an embodiment, before the step of S300, the step of adopting a 2D-image-based workflow to label the 3D point cloud data, the labeling method can further comprise:

S302, obtaining a viewport instruction for determining 2D image viewport.

In an embodiment, after the step of S300, the labeling method can further comprise:

S304, repeating the 2D-image-based workflow by obtaining another viewport instruction to segment the 3D point cloud data. That means the repeating process should be back to S302.

In these embodiments, users can select a specific viewport of a 3D point cloud (may with RGB values) and project it on an image plane. The image is then undergone image segmentation, such as SAM, to generate segmented masks. Users can then edit these image segments, including slicing and combining the masks/segments to adjust the boundaries of the area sharing the same label (for semantic segmentation) or object index (for instance segmentation), and they are then re-projected back to the point cloud. Users can repeat the process by selecting another viewport to label the updated image segments. In an embodiment, that means the repeating process goes from S304 to S302. Those overlapping regions in the point cloud can be fused with labels annotated from multiple viewports. Users can adjust the viewports in the interface so that most of the points can be seen in multiple overlapped projections. For some of the implementations, users can select a dedicated neural network, such as Grounding DINO, to generate text labels, and these text labels can also be projected onto the 3D point clouds.

Most of the time the viewport defined by users cannot cover all the objects of the 3D point cloud, the method allows users to select another viewport so that the process is repeated until the coverage of the segmented points satisfies users' needs.

Since different viewports are adopted to generate 2D images for segmentation and subsequently re-projection back to the 3D point cloud, multiple segmentation results thus exist in the overlapping regions from different viewports. A segment fusion strategy is implemented on the 3D point cloud based on overlapping region fusion.

In the overlapping region fusion process, the segments from different 2D segmentation results are combined if they share the same point subsets. The level of fusion is controlled by the size of the sharing subsets, i.e., the number of points in the sharing subset. Hence, the number of segments in the 3D point cloud is greatly reduced. In another embodiment, the size can also be defined by the area that covers the overlapping point subset, which corresponds to the overlapping area of the object surface in the real world.

In some embodiments, the fusions are conducted based on overlapping regions between either masks/segments or labels. In the first embodiment, if overlapping regions can be found between two masks/segments from two 2D images, and they share the same label (for semantic segmentation) or instance ID (for instance segmentation), the corresponding masks/segments can be combined, and only one of the labels or instance IDs should be maintained. In the second embodiment, if overlapping regions can be found between two masks/segments from two 2D images, and the mask/segment boundaries are accurate enough with minimal errors, the corresponding masks/segments can be combined. Otherwise, masks/segments of different objects might be combined together due to possible errors in segment boundaries. When the boundary accuracy is satisfying enough with barely false fusions, the second embodiment is preferred.

In an embodiment, before the step of S300, the labeling method can further comprise:

obtaining workflow selecting instruction.

if the workflow selecting instruction points to a 2D-image-based workflow, then processing the step of adopting the 2D-image-based workflow to label the 3D point cloud data.

if the workflow selecting instruction points to a 3D-cloud-based workflow, then adopting the 3D-cloud-based workflow to label the 3D point cloud data.

The users may decide if the 2D-image-based workflow or the 3D-cloud-based workflow should be adopted. The 2D-image-based workflow requires less running time and computing resources but only considers visible features, including, but are not limited to, intensity (I), Red (R), Green (G), Blue (B), or any other available coloring schemes, such as height-based coloring, or a combination of any aforementioned features. The coloring schemes include parameters used for defining the color of the objects. In some embodiments, the coloring schemes including but are not limited to, RGB, CMYK, HSV, YIQ, and CIE Lab, can be used in representing the visual features and their characteristics. This applies to all the uses of RGB in the embodiments. Meanwhile, the 3D-cloud-based workflow includes more 3D geometric features, such as local estimated surface normal, curvature, and their changes along the 3D surfaces.

With the 2D-image-based workflow selected, the 3D point cloud enters the workflow that projects the 3D point cloud on an image, segments the image via instance segmentation and re-projects the segments back to the 3D point cloud.

In some embodiments, the 3D point cloud can be projected on a 2D image based on ray tracing techniques or traditional perspective or non-perspective projections in the 2D-image-based workflow. If the ray-tracing technique is adopted, the generation of 3D mesh models is required prior. The parameters of 2D-3D correspondence are also stored so that they are used for subsequent image re-projection back to the 3D point cloud after data segmentation. The 2D image thus undergoes an unsupervised image segmentation, which can be any off-the-shelf open source or publicly available method, for instance, Meta SAM and its variants.

The segmentation of the 2D image pixels is re-projected back to the 3D point cloud with the parameters of 2D-3D correspondence. If there is no correspondence information provided, the 3D coordinates of each corresponding pixel on the 2D image will be computed using the embedded functions of the visualizer.

More particular, in an embodiment, each 2D image is captured from the 3D point cloud from a specific projective perspective. Thus, the 2D-3D correspondence stores the transformation parameters and the correspondence between the 3D point cloud scene and the 2D image frame, in the form of each set of the 3D point coordinates in the real world and its corresponding coordinates in the 2D image frame. These transformation parameters or 2D-3D correspondences are subsequently used to re-project the image segments back to the 3D point cloud. For example, if Point $A^3$ with the 3D coordinates of $(x_a, y_a, z_a)$ corresponds to its 2D-pixel position of $(x_a, y_a)$, and we already know the pixel of $(x_a, y_a)$ falls into the segment $B^2$, then we know that point $A^3$ is part of the segment $B^3$ in the 3D space. It works for the point in this pixel that is the closest to the viewport position. For example, if (1) the projections of point B and point C are located in the same pixel, (2) the image is generated at viewport position A, and (3) the distance between A and B (AB) is smaller than the distance between A and C (AC), then the segment will project to only point B. When the distance difference is smaller enough than a given threshold, such as the corresponding distance between the centers of each pixel in real world (pixel size), i.e., the difference between AB and AC is smaller enough, the re-projection works for both B and C.

In some embodiments, after S200, the labeling method further comprises a step of:

S400, if the scenario is that the 3D point cloud data includes insufficient labeled data, adopting the 2D-image-based workflow or a 3D-cloud-based workflow to label the 3D point cloud data.

In an embodiment, before the step of S400, the labeling method can further comprise:

obtaining workflow selecting instruction.

if the workflow selecting instruction points to 2D-image-based workflow, then adopting a 2D-image-based workflow to label the 3D point cloud data.

if the workflow selecting instruction points to 3D-cloud-based workflow, then adopting a 3D-cloud-based workflow to label the 3D point cloud data.

In the step of S400, feature vectors (including intensity, RGB, surface normal, etc.) can be constructed based on the available but yet sufficient labeled data. 3D point cloud labeling can be undergone with point cloud segmentation to generate segments for the point cloud. Users are allowed to perform labeling on these segments same as the step of S380.

In some embodiments, once the point cloud is partitioned into different segments, users can assign specific labels in accordance with the user's self-defined classification schema (e.g., pipe=1, joint=2, elbow=3, valve=4, etc.) or specific classification codes defined by professional bodies (e.g., American Society for Photogrammetry and Remote Sensing [ASPRS] land use and land cover classification system). The label assignment can be based on a manual process in which the user assigns labels to each of the segments. With the dedicated text label generated in the dedicated machine learning models, point labels in the segments with associated text labels can be automatically annotated according to the selected classification schema defined above. Finally, all the points in the 3D point cloud should be assigned a specific label according to the classification schema or code.

In the 3D-cloud-based workflow, feature vectors, such as surface normal, RGB, intensity, and curvature, can be constructed and adopted for the 3D point cloud segmentation. The 3D point cloud segmentation model, which is based on any off-the-shelf unsupervised segmentation, can be applied to the feature vectors of the 3D point cloud. Text-prompt labels can also be generated and assigned to the points directly to achieve higher automation levels. Users can then assign specific labels to the segments.

With the use of dedicated machine learning models, the text labels of the masks can be generated, to facilitate the labeling process. On the other hand, given a dedicated list of text labels, masks with the text prompt of labels from the list can be generated using a dedicated machine learning model, such as Grounded Language-Image Pre-training (GLIP) or Grounding DINO.

In an embodiment, after S300 and S400, the labeling method can further comprise a manual labeling step. In the embodiment with S300 followed by S304, the manual labeling step should occur after S304. The labeling operation can be conducted based on the 3D point cloud segments. Then, in addition to the manual labeling step, there is a possibility of using neural network-based text label generation.

In some embodiments, after S200, the labeling method further comprises a step of:

S500, if the scenario is that the 3D point cloud data includes sufficient labeled data, training a segmentation model with the 3D point cloud data, and then obtaining labels for unlabeled data through the segmentation model. The segmentation model can be a semantic segmentation model or an instance segmentation model. The 3D point cloud data in this step has been labeled. The segmentation model in this step means the selected segmentation model.

In case sufficient labeled data is available, the method also allows users to train a supervised-learning-based segmentation model based on selected features, including, but not limited to, intensity (I), Red (R), Green (G), Blue (B), local estimated normal direction, and curvature. With the newly labeled data, the segmentation module keeps evolving until the labeling accuracy fits the users' needs.

With more data labeled, users may start the pre-training and re-training loop, conducting fine adjustments, and examining the point cloud and labels to facilitate the labeling process. In an embodiment, the dedicated procedure can be as follows: (1) Following S500, get the labeling results (labels of 3D points) from 3D-based semantic or instance segmentation. In most of the cases, there are still labeling errors, especially errors in segment boundaries. (2) Following S300, get the segments (segments of 3D points) using the method in 2D-based method, with more clear and precise boundaries of objects. (3) Select all points within each segment generated in (2) and conduct a vote of labels, which are generated in (1), the label with the highest frequency will be assigned to each point within this segment. Thus the segment with more clear and precise boundary (in terms of RGB representation) can be generated automatically.

Figure 3A:
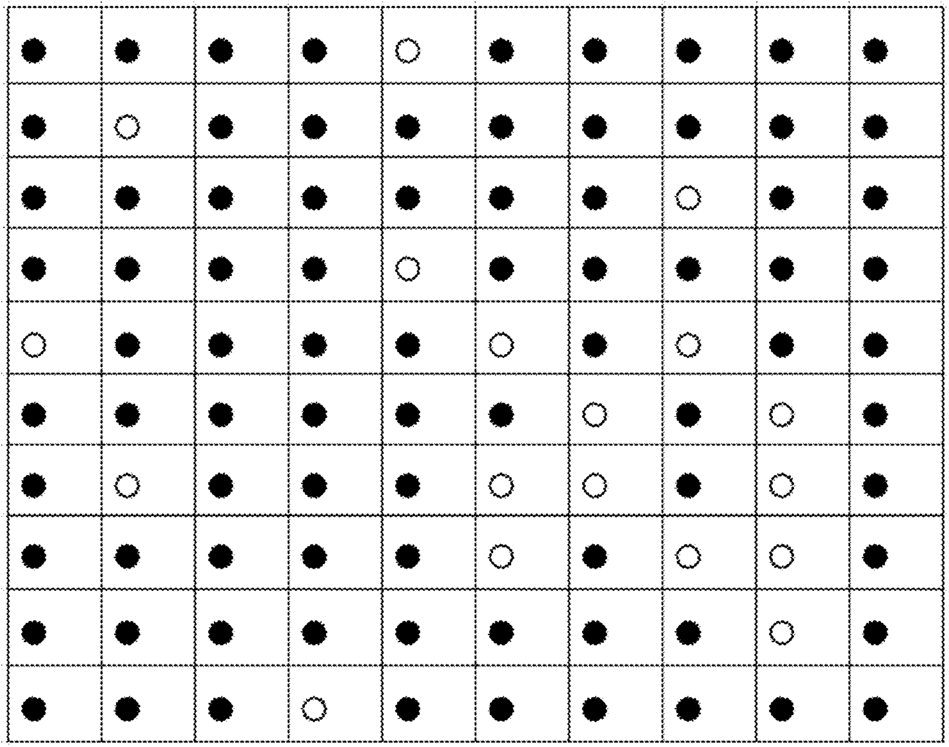
FIGS. 3A-D illustrates a pre-training and re-training loop, according to another embodiment of the present disclosure.
Figure 3B:
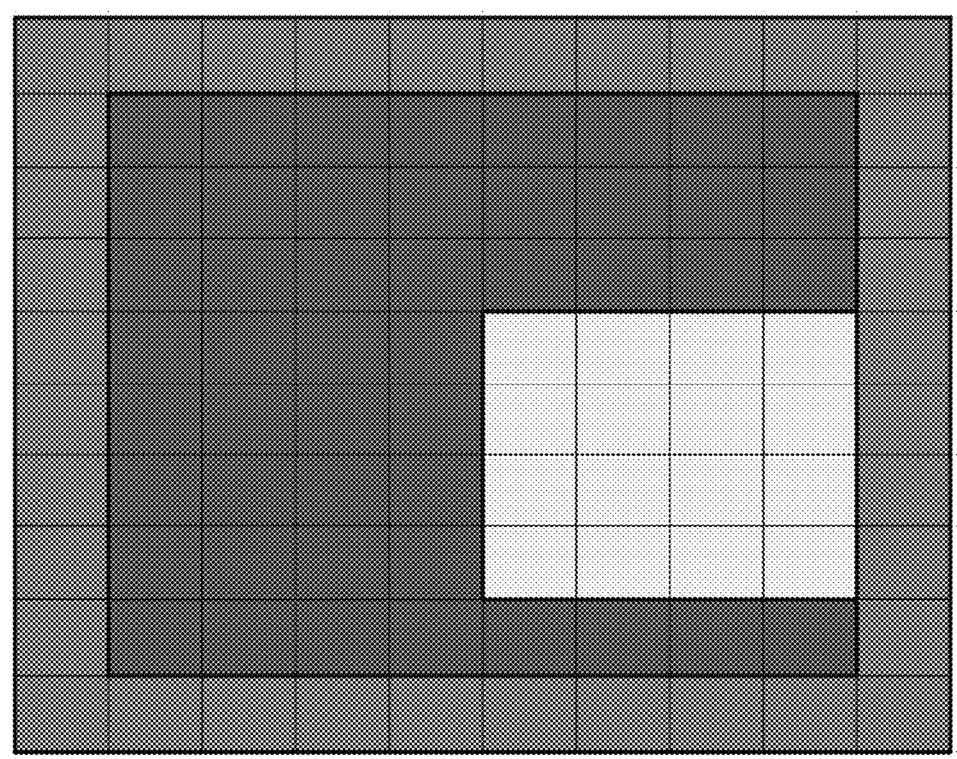
Figure 3C:
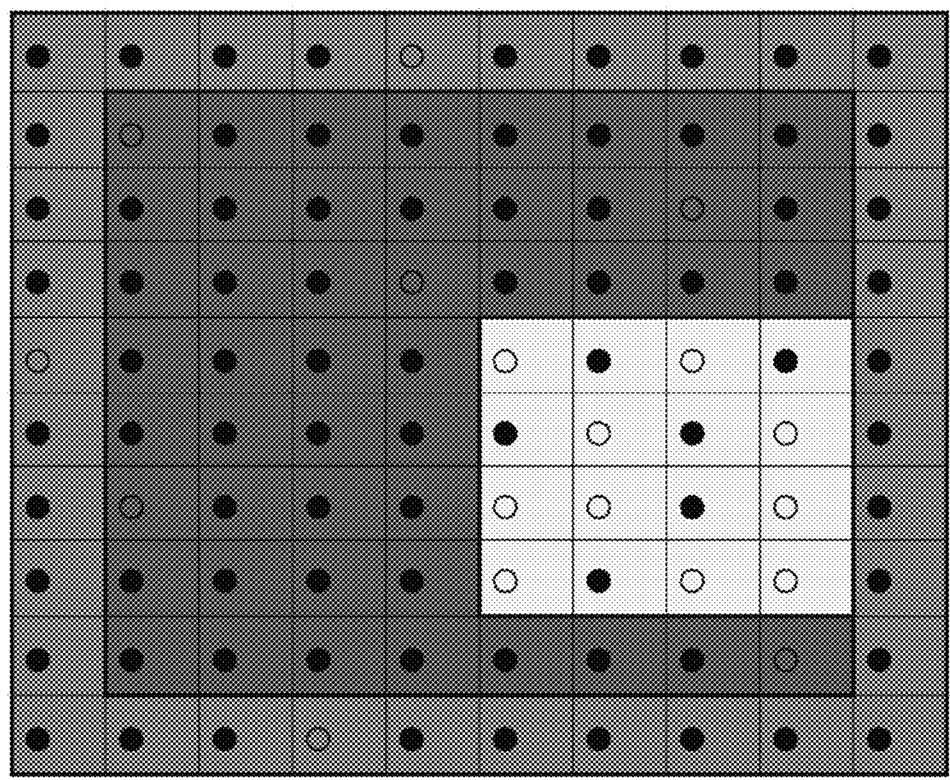
Figure 3D:
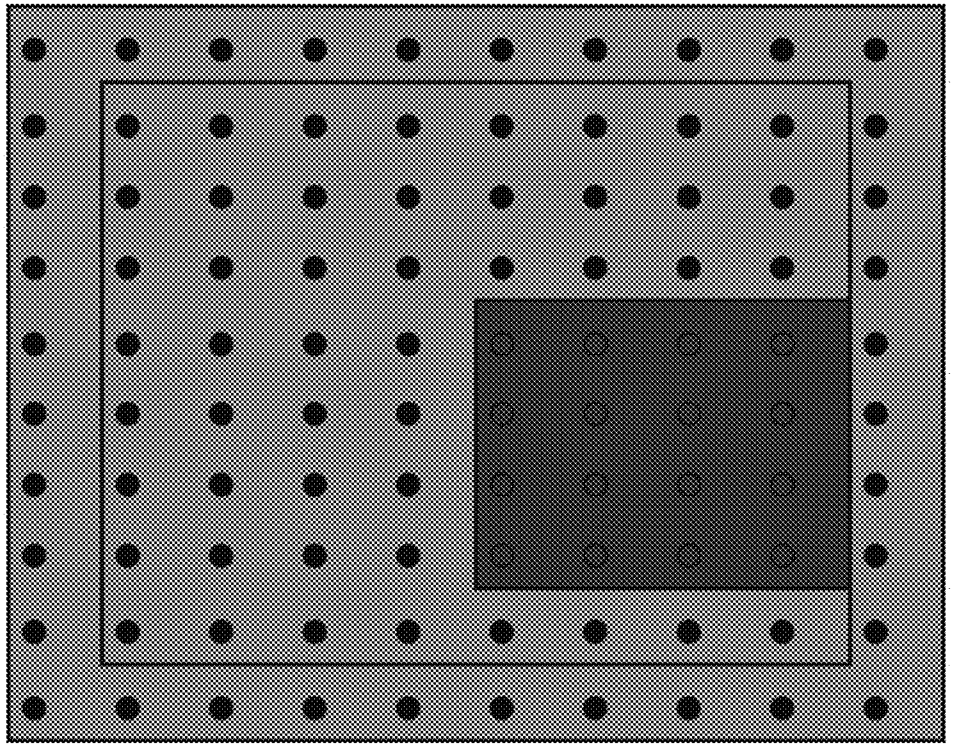

And more concretely, FIG. 3A shows an embodiment of points from 3D semantic segmentation. FIG. 3B shows an embodiment of labels derived from 2D image workflow. Referring to FIG. 3C, we combine the semantic segmentation results from (1) with each segmented mask derived from (2) and then vote. Referring to FIG. 3D, take the small segment as example, since there are 10 hollow points and 6 black points in the small segment, we then assign all the points as hollow points in the small segment.

Figure 4:
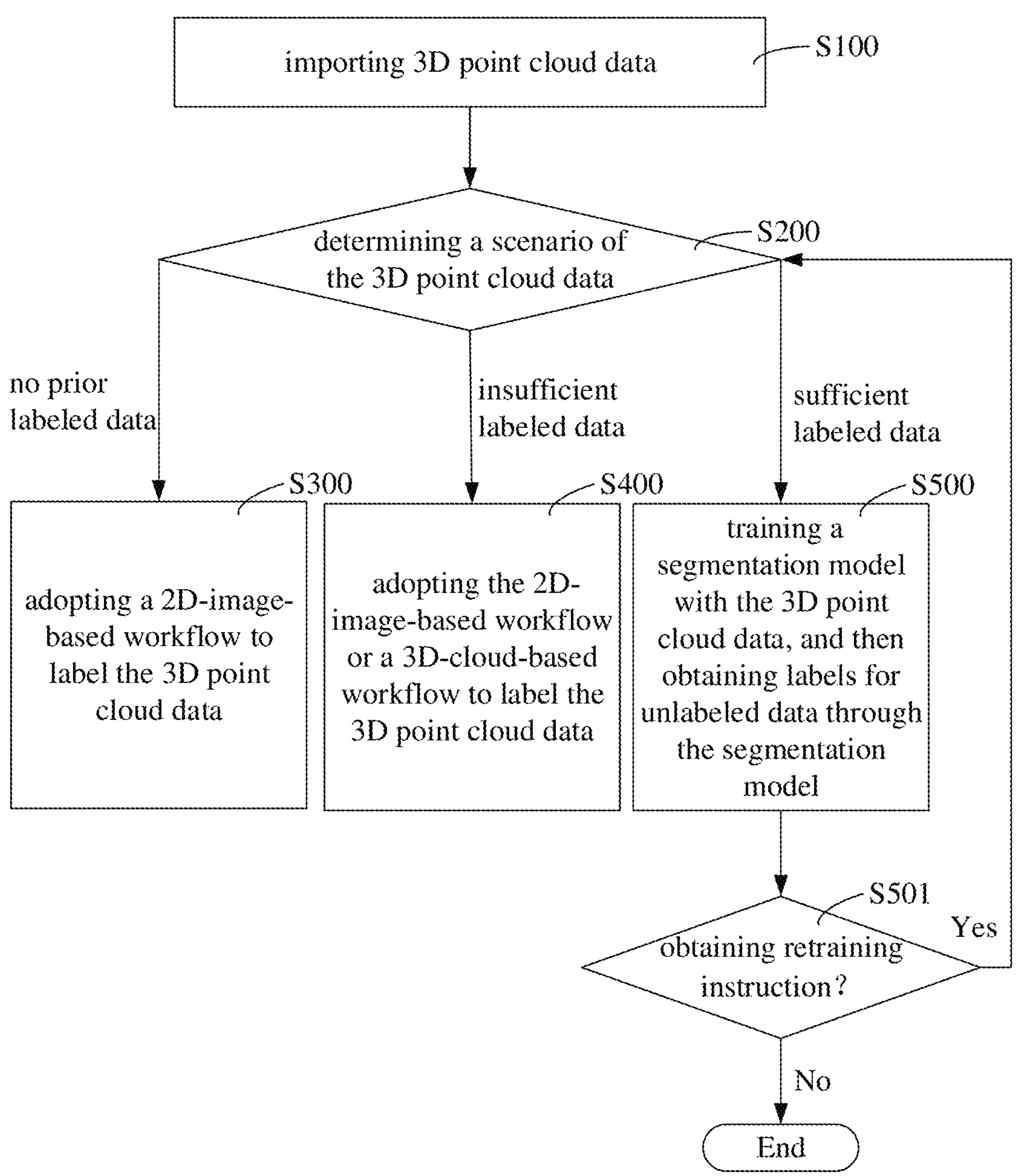
FIG. 4 illustrates a labeling method for 3D point cloud segmentation, according to another embodiment of the present disclosure.

Referring to FIG. 4, in an embodiment, after the step of S500, the labeling method can further comprise:

S501, obtaining retraining instruction; and returning to the step of S100 if there is a retraining instruction.

The end of the three scenarios in S300, S400 and S500 leads to S501, which allow users to perform fine adjustment of the assigned labels accordingly. If the amount of labeled data is not sufficient enough in terms of segmentation accuracy (i.e., precision, recall, F1-score, IoU, etc.), the labeling method allows users to iterate the above-mentioned process to generate more labeled data and re-train the machine learning/deep learning model.

Figure 5:
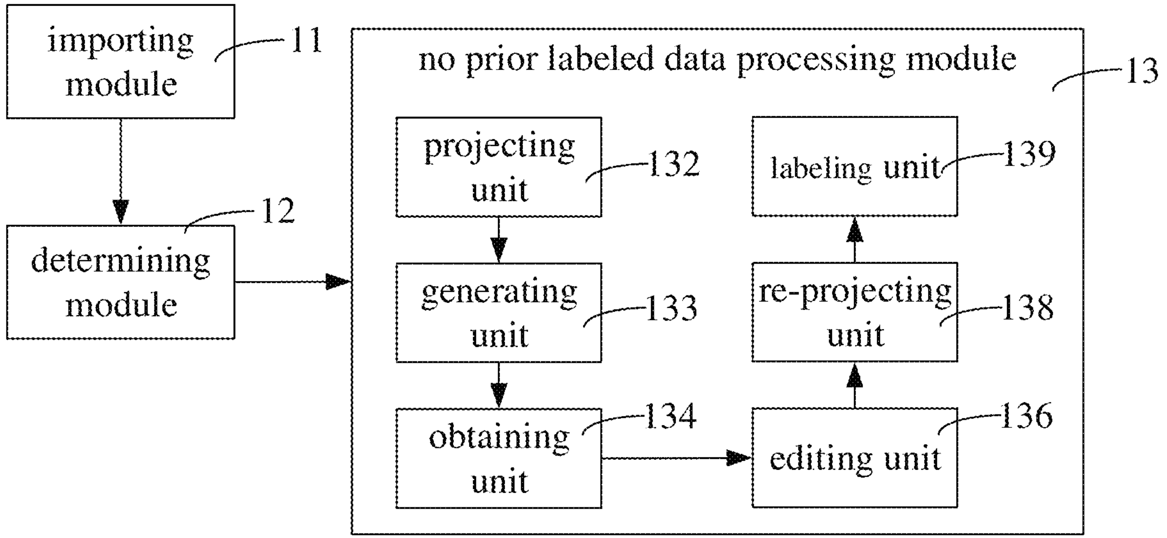
FIG. 5 illustrates a labeling system for 3D point cloud segmentation, according to an embodiment of the present disclosure.

Referring to FIG. 5, an embodiment of the present disclosure provides a labeling system for 3D point cloud segmentation. The labeling system comprises an importing module 11, a determining module 12, and a no prior labeled data processing module 13. The 2D-image-based workflow of the no prior labeled data processing module 13 comprises a projecting unit 132, a generating unit 133, an obtaining unit 134, an editing unit 136, a re-projecting unit 138, and a labeling unit 139.

The importing module 11 is configured to perform the step of S100. The determining module 12 is configured to perform the step of S200. The no prior labeled data processing module 13 is configured to perform the step of S300, if the scenario is that the 3D point cloud data includes no prior labeled data.

The projecting unit 132 is configured to perform the step of S320. The generating unit 133 is configured to perform the step of S330. The obtaining unit 134 is configured to perform the step of S340. The editing unit 136 is configured to perform the step of S350. The re-projecting unit 138 is configured to perform the step of S360. The labeling unit 139 is configured to perform the step of S380.

Figure 6:
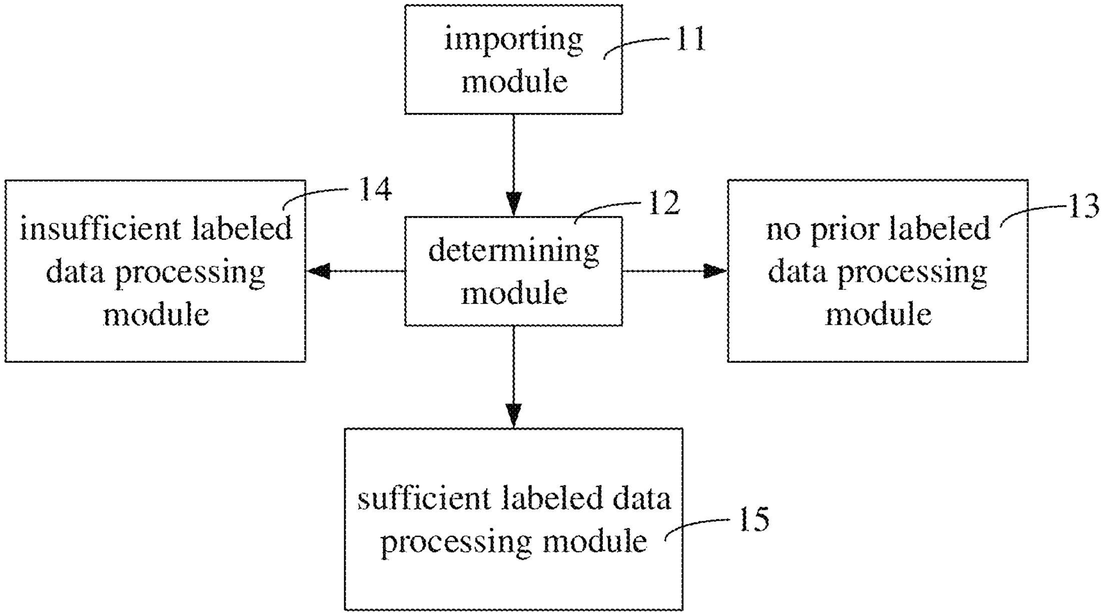
FIG. 6 illustrates a labeling system for 3D point cloud segmentation, according to another embodiment of the present disclosure.

In an embodiment, referring to FIG. 6, the labeling system can further comprise an insufficient labeled data processing module 14 and a sufficient labeled data processing module 15. The insufficient labeled data processing module 14 is configured to perform the step of S400, if the scenario is that the 3D point cloud data includes insufficient labeled data. The sufficient labeled data processing module 15 is configured to perform the step of S500, if the scenario is that the 3D point cloud data includes sufficient labeled data.

Compared to traditional assistant software programs, the labeling methods and systems in the embodiments can significantly reduce the time and manual effort for 3D point cloud segmentation. They can mainly deal with dense high-resolution 3D point clouds collected by survey-grade laser scanners (or Light Detection and Ranging (LiDAR)) or close-range imaging systems, which ultimately serve the purposes of 3D reconstruction, Building Information Model (BIM) or 3D Geographic Information System (GIS) after semantic segmentation or instance segmentation, as well as the object detection and localization applications.

CloudCompare is a point cloud software tool offering visualization module that allows users to conduct manual labeling. However, the software has a lack of advanced segmentation, unlike the present embodiments, that can first group data points with similar RGB values/geometry. Users of the labeling methods and systems in the embodiments are able to label the segment masks on the point cloud instead of labeling each point individually. Thus, the labeling methods and systems in the embodiments can significantly improve the efficiency compared to the use of CloudCompare.

Regarding Amazon SageMaker, it offers an online platform allowing users to conduct manual labeling. Similar to CloudCompare, the tool does not embed with any AI-assisted or advanced segmented masks that facilitate easy labeling. Also, the target users of SageMaker mainly deal with point clouds collected by autonomous vehicles with low-resolution sensors, while the present invention focuses on high-resolution LiDAR point clouds.

In short, the present invention, which stands out from similar tools, considers three different scenarios, offers initial segments for preliminary labeling, generates a prediction of point cloud classification and/or instance boundaries, and then allows users to perform re-labeling until a desired accuracy is achieved.

Some automatic labeling technologies under development may adopt 3D unsupervised clustering on the point cloud, while the embodiments of the invention adopt a quicker approach by projecting 3D point cloud on 2D images to conduct unsupervised segmentation on insufficient data. The generated segmented masks thus facilitate users to conduct manual labeling efficiently. Furthermore, the edges and boundaries generated by 2D-image-based workflow are more accurate and precise according to our tests. Therefore, projecting the 3D point cloud on 2D images to generate segments would be significantly more efficient. Also, the labeling methods and systems in the embodiments allow users to conduct pre-labeling and re-labeling process, supported by a deep learning-based neural network model to provide a prediction.

The technical features in the foregoing embodiments may be randomly combined. For a concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of the disclosure, which are described specifically and in detail, and therefore cannot be construed as a limitation to the patent scope of the disclosure. It should be noted that, a person of ordinary skill in the art may further make variations and improvements without departing from the ideas of the disclosure, which all fall within the protection scope of the disclosure. Therefore, the protection scope of the disclosure is subject to the protection scope of the appended claims.

What is claimed is:

1. A labeling method for 3D point cloud segmentation, the labeling method comprising steps of:

importing 3D point cloud data;

determining a scenario of the 3D point cloud data;

if the scenario is that the 3D point cloud data includes no prior labeled data, adopting a 2D-image-based workflow to label the 3D point cloud data; the 2D-image-based workflow comprising:

projecting the 3D point cloud data on 2D images;

generating segmented masks under unsupervised image segmentation;

obtaining a segmentation instruction;

editing the segmented masks according to the segmentation instruction;

re-projecting the segmented masks back to the 3D point cloud data; and labeling the 3D point cloud data;

if the scenario is that the 3D point cloud data includes insufficient labeled data, adopting the 2D-image-based workflow or a 3D-cloud-based workflow to label the 3D point cloud data; and if the scenario is that the 3D point cloud data includes sufficient labeled data, training a segmentation model with the 3D point cloud data, and then obtaining labels for unlabeled data through the segmentation model.

2. The labeling method of claim 1, wherein before the step of adopting a 2D-image-based workflow to label the 3D point cloud data, the labeling method further comprising:

obtaining viewport instruction for determining 2D image viewport.

3. The labeling method of claim 2, wherein after the step of adopting a 2D-image-based workflow to label the 3D point cloud data, the labeling method further comprising:

repeating the 2D-image-based workflow by obtaining another viewport instruction to segment the 3D point cloud data.

4. The labeling method of claim 2, wherein after the step of labeling the 3D point cloud data and the step of obtaining viewport instruction for determining 2D image viewport, the labeling method further comprising:

selecting all points within each segmented mask and conducting a vote of labels, and assigning the label derived from the step of training a segmentation model with the 3D point cloud data, and then obtaining labels for unlabeled data through the segmentation model with highest frequency to each point within the segmented mask.

5. The labeling method of claim 1, wherein before the step of adopting a 2D-image-based workflow to label the 3D point cloud data, the labeling method further comprising:

obtaining workflow selecting instruction;

if the workflow selecting instruction points to a 2D-image-based workflow, then processing the step of adopting the 2D-image-based workflow to label the 3D point cloud data;

if the workflow selecting instruction points to a 3D-cloud-based workflow, then adopting the 3D-cloud-based workflow to label the 3D point cloud data.

6. The labeling method of claim 1, wherein before the step of adopting the 2D-image-based workflow or a 3D-cloud-based workflow to label the 3D point cloud data, the labeling method further comprising:

obtaining workflow selecting instruction;

if the workflow selecting instruction points to 2D-image-based workflow, then adopting a 2D-image-based workflow to label the 3D point cloud data;

if the workflow selecting instruction points to 3D-cloud-based workflow, then adopting a 3D-cloud-based workflow to label the 3D point cloud data.

7. The labeling method of claim 1, wherein after the step of obtaining labels for unlabeled data through the segmentation model, the labeling method further comprising:

obtaining retraining instruction; and returning to the step of importing 3D point cloud data.

8. The labeling method of claim 1, wherein after the step of re-projecting the segmented masks labeled back to the 3D point cloud data; and before the step of labeling the 3D point cloud data, the 2D-image-based workflow further comprising:

fusing the segmented masks which overlap.

9. The labeling method of claim 1, wherein in the step of training a segmentation model with the 3D point cloud data, and then obtaining labels for unlabeled data through the segmentation model, the segmentation model is a semantic model or an instance segmentation model.

* * * * *